No. 616,962. Patented Jan. 3, 1899.
S. PATTISSON.
PNEUMATIC TIRE.
(Application filed Dec. 28, 1897.)

(No Model.)

WITNESSES

INVENTOR
Sidney Pattisson.
by Herbert W. T. Jenner.
Attorney

UNITED STATES PATENT OFFICE.

SIDNEY PATTISSON, OF LONDON, ENGLAND.

PNEUMATIC TIRE.

SPECIFICATION forming part of Letters Patent No. 616,962, dated January 3, 1899.

Application filed December 28, 1897. Serial No. 664,119. (No model.)

*To all whom it may concern:*

Be it known that I, SIDNEY PATTISSON, a subject of the Queen of Great Britain, residing at Kensington, London, in the county of Middlesex, England, have invented a new and useful Improvement in Pneumatic Tires, (for which I have obtained a patent in Great Britain, No. 27,491, bearing date November 23, 1897,) of which the following is a full and complete specification.

This invention relates to tire-fasteners; and it consists in the novel construction and combination of the parts hereinafter fully described and claimed.

Figure 1:
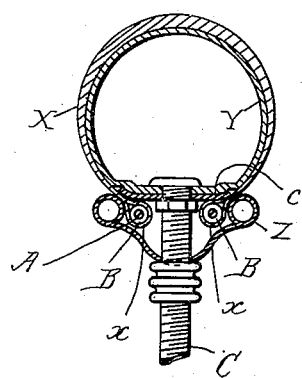
Figure 2:
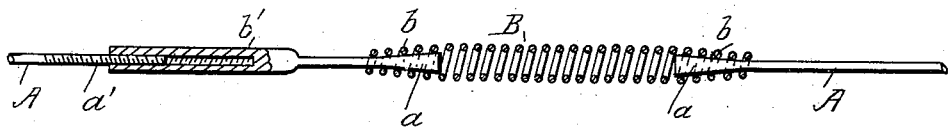

In the drawings, Figure 1 is a cross-section through a tire, and Fig. 2 is a side view of a portion of the tire-fastener.

Z is the rim of a wheel.

Y is the air-tube, and X is the cover, which is provided with pockets $x$ at its edges.

C is the stem of the air-valve, which is attached to the tube Y and a plate $c$.

The tire-fastener consists of a wire A, inserted in each pocket $x$.

B is a helical coiled spring which connects the ends of the wire A, which extends around the rim and secures the tire in position. The spring B has a conical portion $b$ at each end, and the smaller portion of each portion $b$ is at the end of the spring.

The wire A has a screw-threaded end portion $a'$, and $b'$ is a screw-threaded socket which engages with the part $a'$ and forms an adjustable prolongation of the wire. The socket $b'$ is provided with a conical end portion $a$, which engages with the part $b$ at one end of the spring. The other end of the wire also has a conical end portion $a$, which engages with the part $b$ at the other end of the spring.

What I claim as my invention, and desire to secure by Letters Patent, is—

In a tire-fastener, the combination, with a helical coiled spring having a conical portion at one end, the smaller part of the said conical portion being at the end of the said spring; of a wire provided with a screw-threaded end portion, and a screw-threaded socket engaging with the said screw-threaded portion and thereby forming an adjustable prolongation of the said wire, said socket being also provided with a conical end portion which engages with the said conical portion of the spring and connects the wire with the spring, substantially as set forth.

SIDNEY PATTISSON.

Witnesses:
W. M. HARRIS,
FRED C. HARRIS.